United States Patent
Lazim et al.

(10) Patent No.: US 12,399,696 B2
(45) Date of Patent: Aug. 26, 2025

(54) AUTOMATIC UPDATING OF APPLICATION FUNCTIONALITY

(71) Applicant: Omnissa, LLC, Mountain View, CA (US)

(72) Inventors: Mohammed Lazim, Bangalore (IN); Madhavan Madhavan Bhattathiri, Bangalore (IN); Sruthi Surendran, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/449,536

(22) Filed: Sep. 30, 2021

(65) Prior Publication Data

US 2023/0102816 A1    Mar. 30, 2023

(51) Int. Cl.
*G06F 8/65* (2018.01)
*G06F 8/36* (2018.01)
*G06F 8/71* (2018.01)

(52) U.S. Cl.
CPC .............. *G06F 8/65* (2013.01); *G06F 8/36* (2013.01); *G06F 8/71* (2013.01)

(58) Field of Classification Search
CPC ..... G06F 8/65; G06F 8/36; G06F 8/71; G06F 8/70; G06F 21/105; G06F 8/61; G06F 9/44505; G06F 9/4401; G06F 9/547; G06F 9/44526; H04L 63/0428
See application file for complete search history.

(56) References Cited

U.S. PATENT DOCUMENTS

| | | | |
|---|---|---|---|
| 8,892,954 B1* | 11/2014 | Gray | G06F 8/71 714/38.11 |
| 2001/0029605 A1* | 10/2001 | Forbes | G06F 8/61 717/170 |
| 2006/0236317 A1* | 10/2006 | Wetherly | G06F 8/65 717/168 |
| 2011/0225217 A1* | 9/2011 | Plax | G06F 16/2379 707/825 |
| 2017/0060568 A1* | 3/2017 | Seibert, Jr. | G06F 8/71 |
| 2018/0067734 A1* | 3/2018 | Prasad | G06F 11/3438 |
| 2018/0213347 A1* | 7/2018 | Kumar | H04L 41/5054 |
| 2019/0171437 A1* | 6/2019 | Guda | G06F 8/71 |
| 2022/0269775 A1* | 8/2022 | Tsirkin | G06F 21/78 |

FOREIGN PATENT DOCUMENTS

| | | | |
|---|---|---|---|
| CN | 109933350 A | * | 6/2019 |
| CN | 112882732 A | * | 6/2021 |
| WO | WO-2020181814 A1 | * | 9/2020 |

OTHER PUBLICATIONS

Translated CN 109933350 A; 22 pages (Year: 2019).*
Translated WO 2020181814; 21 pages (Year: 2020).*
Zhu et al.; translated CN 112882732-A; 25 pages (Year: 2021).*

* cited by examiner

*Primary Examiner* — S. Sough
*Assistant Examiner* — Cuong V Luu
(74) *Attorney, Agent, or Firm* — Kim & Stewart LLP

(57) ABSTRACT

An application incorporating a software development kit library is updated by first obtaining an updated binary corresponding to the library. The application is then unpackaged and subsequently repackaged with the updated library. The updated application can be distributed to managed devices by a management service.

16 Claims, 6 Drawing Sheets

AUTOMATIC UPDATING OF APPLICATION FUNCTIONALITY

BACKGROUND

With the emergence of mobile devices in enterprise environments, administrators of an enterprise technology infrastructure face constantly changing security threats to the mobile devices of their users. In some cases, bring-your-own-device (BYOD) policies of an enterprise permit employees or other personnel to use their own devices for business purposes. Devices can be used to access enterprise data, such as email and corporate documents. Certain mobile applications can include security features that can encourage user and device compliance with rules that are designed to improve enterprise security. To include theses features, applications can include one or more libraries that incorporate these features. The libraries can be provided by a third party that is not the same as an application developer.

However, as these libraries are updated to eliminate security vulnerabilities as well as update the features that are included within the libraries, application developers may not update their respective applications according to the same update or release schedule as a developer providing the software development kit (SDK) libraries that include the security features. Accordingly, ensuring that applications that incorporate third party libraries that implement certain features are updated can be important to maximize enterprise security and compliance with enterprise information technology (IT) compliance rules.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to restricting updating features within an application that are provided by a third-party library within the application. The features can be provided by one or more libraries that can be embedded into an application by the application developer. The libraries can be software development kit (SDK) libraries that are embedded into the application by the application developer. For example, an application developer might wish to embed enterprise security and authentication capabilities into an application without directly developing and updating the features. For example, the SDK library can provide features related to data loss prevention, virtual private networking (VPN) capabilities, user authentication or single sign-on, certificate-based authentication, security updates, network security, and other features associated with an application.

As security vulnerabilities and general security updates are provided to the SDK library, these updates can be provided to application developers in the form of an updated version of a binary file corresponding to the SDK library. In some cases, these updates can be provided periodically or regularly. Prior solutions to providing these updates to application developers could require the developer to create an updated version of an application that incorporates the SDK library. However, the update release schedule of an application developer might vary from the update release schedule of the SDK library. For example, an SDK library might be updated with important security or feature updates every month, but an application developer may only update their application quarterly or even without regard to an update schedule.

Therefore, examples of the disclosure can provide a mechanism to update features within an SDK library utilized by an application without requiring the application developer to update the application. Devices that are enrolled as managed devices with a management service can be provided an updated version of an application with updated SDK libraries without any intervention on behalf of the end-user.

Figure 1:
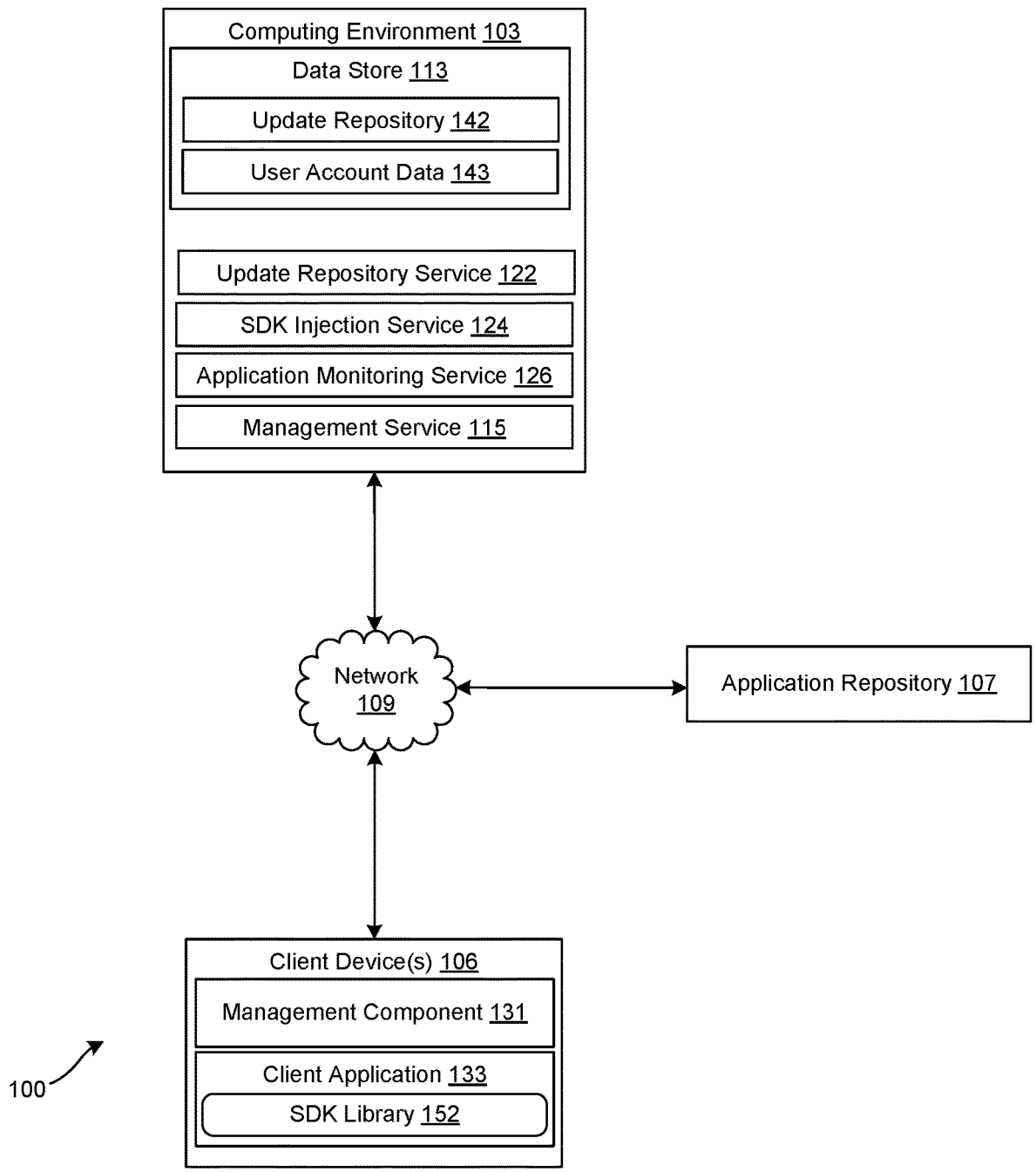
FIG. 1 is a drawing of a networked environment that includes a computing environment and one or more client devices.

With reference to FIG. 1, shown is an example of a networked environment 100. The networked environment 100 can include a computing environment 103, one or more client devices 106, and an application repository 107 in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include wireless networks, satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement.

The computing devices can be located in a single installation or can be distributed among many different geographical locations. The computing environments 103 can also include or be operated as one or more virtualized computer instances. For purposes of convenience, the computing environment 103 is referred to herein in the singular, although it is understood that a plurality of computing environments 103 can be used. As the computing environment 103 communicates with the client devices 106 remotely over the network 109, the computing environment 103 can be described as a "remote" or a "cloud" computing environment 103.

The computing environment 103 can include a data store 113. The data store 113 can include memory of the computing environment 103, mass storage resources of the computing environment 103, or any other storage resources on which data can be stored by the computing environment 103. The data store 113 can include one or more databases, such as a structured query language (SQL) database, a non-SQL database, or other appropriate database. The data stored in the data store 113, for example, can be associated with the operation of the various applications or functional entities described below.

The components executed on the computing environment 103 can include, for example, the management service 115, the update repository service 122, the SDK injection service 124, the application monitoring service 126, as well as other applications, services, processes, systems, engines, or functionality not discussed in detail herein. The management service 115 can oversee the operation of client devices 106 enrolled as managed devices with the management service 115. In some embodiments, an entity, such as one or more enterprises, companies, or other organizations, can operate the management service 115 to oversee or manage the operation of the client devices 106 of its employees, contractors, customers, or other users having an account with the management service 115.

The management service 115 can install various software components on a client device 106. For example, the management service 115 can install client applications 133, resources, libraries, drivers, configuration profiles, or other components on the client device 106 as specified by an administrator of the management service 115. The management service 115 can also cause policies to be implemented on a client device 106. Policies can include restrictions or permissions pertaining to capabilities of a client device 106 that can pertain to accessing enterprise data on the client device 106.

The management service 115 can interact with one or more client applications 133 executed on the client device 106 to perform management functions. In one example, the management service 115 can interact with a management component 131 on the client device 106, which can carry out various management functions on behalf of the management service 115 on the client device. The management component 131 can be installed when the client device 106 is enrolled as a managed device with the management service 115. When enrolled, the management component 131 can be registered as a device administrator of the client device 106, which can provide the management component 131 with sufficient privileges to control the operation of the client device 106. In one example, the management component 131 can be registered as the device administrator through the installation of a management profile that causes the operating system to designate the management component 131 as the device administrator.

The management service 115 can direct the management component 131 to perform various device management functions on the client device 106. For example, the management service 115 can direct the management component 131 to control access to certain software or hardware functions available on the client device 106. As a result, the management service 115 can verify that the configuration and operation of the client device 106 conforms with predefined criteria that ensures that data on the client device 106 is protected from data loss, unauthorized access, or other harmful events.

The management service 115 can also instruct the management component 131 to install other client applications 133 that can provide other capabilities for the user. For example, a client application 133 can include a productivity application, a communication application, a security application, or any other application designated by an administrator as necessary or useful to a user of the device. In one scenario, the management component 131 can install client applications 133 on the device on behalf of the user. In other scenarios, a user can download and install a particular client application 133 on the client device 106 without intervention from the management component 131.

A client application 133 can also incorporate an SDK library that can implement one or more management features with which the management service 115 can interact. For example, the client application 133 can utilize user authentication capabilities provided by an embedded SDK library, which can authenticate users of an enterprise using an identity manager provided on behalf of the enterprise. As another example, the client application 133 can utilize certificate-based authentication capabilities that are provided by the SDK library so that the application need not implement the specific protocol utilized by the certificate-based authentication framework.

The update repository service 122 represents an application or process that can obtain and serve as a host for SDK library releases. When a binary file corresponding to an updated version of the SDK library is available, the updated version can be provided to the update repository service 122. The update repository service 122 can provide a portal through which the updated version of the SDK library can be uploaded to the update repository service 122. The update repository service 122 can generate an entry in an update repository 142 that corresponds to the updated version of the SDK library.

The update repository 142 can store metadata about the updated version of an SDK library. The metadata can include a version number of an updated version. In some examples, the update repository service 122 can analyze the version number relative to a previously provided version of the SDK library to determine whether the update represents a major update or a minor update to the SDK library.

The update repository 142 can also store information about the supported operating systems pertaining to an updated version of an SDK library. The update repository service 122 can determine, based on the supporting operating systems, whether an SDK library binary on a client device 106 should be updated with an updated version of the SDK library.

The update repository 142 can also store a supported version of the management service 115 pertaining to the updated version of the SDK library. This information can assist in verifying if an update to the SDK library is value based upon the supported version. If the supported version of the management service 115 that is specified by the SDK library is not a valid version number, the update repository service 122 can avoid causing the management service 115 to update managed devices with the provided update to the SDK library.

The update repository 142 can also store an updated breaking features list for a provided update to the SDK library. The updated breaking features list can be utilized to determine whether an update to the SDK library, if integrated into a client application 133, will cause certain features of the SDK library utilized by the client application 133 to stop functioning. In other words, certain aspects of an update to the SDK library may not be backwards compatible. For example, the SDK library might implement certificate based integrated authentication, which can be utilized by a client application 133 incorporating the SDK library. A subsequent version of the SDK library might update this feature such that it is incompatible with the client application 133 unless the client application 133 itself is updated to account for the updates to the feature within the SDK library.

The management service 115 can register with the update repository service 122 to receive notifications or indications about the availability of an updated version of an SDK library. Upon receiving such a notification, the management service 115 can then queue binary versions of client applications 133 that incorporate the SDK library for updating. The client applications 133 can be updated the SDK injection service 124 as described herein.

The SDK injection service 124 represents an application or service that can receive an application binary of a client application 133, such as Android package, an Android App Bundle, an iOS application archive file, or any other binary file corresponding to a client application 133 that incorporates an SDK library that is stored in the update repository 142. The SDK injection service 124 can also receive a binary file corresponding to an updated SDK library that is provided to the update repository service 122. The SDK injection service 124 can be invoked by the management service 115 to update the SDK library within a client application 133 without requiring the developer of the client application 133 to update the application binary.

The SDK injection service 124 can utilize application wrapping techniques to replace only the binary corresponding to the SDK library within an application package or executable file. In one example, the SDK injection service 124 can download or obtain a binary file corresponding to an application from the management service 115 or an application repository 107. The SDK injection service 124 can also download or obtain a binary file corresponding to an updated version of the SDK library from the update repository 142. In some examples, the binary corresponding to the SDK library can be obtained via the update repository service 122.

The SDK injection service 124 can unpackage the binary file corresponding to the client application 133. The SDK injection service 124 can locate the SDK library binary within the client application 133. In one example, the SDK injection service 124 can look for a signature or another characteristic of the SDK library binary within the client application 133.

The SDK injection service 124 can then replace the SDK library binary within the client application 133 with the binary file corresponding to the updated version of the SDK library. The SDK injection service 124 can then update a minor version number corresponding to the client application 133, to indicate that the application has been updated with the updated version of the SDK library. In some examples, the version number update can be provided to the application repository 107 or the update repository service 122.

The SDK injection service 124 can re-sign the client application 133 if necessary according to the operating system for which the client application 133 is meant. The client application 133 can be re-signed using a developer certificate as can be required by an operating system ecosystem for which the client application 133 is meant. The SDK injection service 124 can then cause the management service 115 to deploy the updated client application 133 to managed devices. In one example, the management service 115 can send a command to managed devices to retrieve the updated client application 133 from an application repository 107 in which the updated client application 133 can be stored by the SDK injection service 124.

It should be noted that it is not necessary for a client device 106 to be managed by a management service 115 according to all examples of the disclosure. In some instances, a client device 106 can simply have a client application 133 installed that incorporates the functionality of an SDK library that can be updated by the SDK injection service 124 as described herein.

The application monitoring service 126 can monitor various instances or installations of a client application 133 that includes an SDK library that was pushed to devices by the management service 115 or otherwise installed on a client device 106. The application monitoring service 126 can monitor crash data, or cases of the client application 133 crashing on the client device 106. If crash data indicates a crash rate that is higher than a threshold, the application monitoring service 126 can notify the management service 115, which can cease rollout of an updated client application 133 incorporating an updated version of the SDK library.

The application monitoring service 126 can also monitor initialization failure data associated with the SDK library. Initialization failure data can comprise a failure of the SDK library or a feature implemented by the SDK library from initialization or otherwise functioning but without causing the client application 133 to crash. If initialization failure data indicates an initialization failure rate that is higher than a threshold, the application monitoring service 126 can notify the management service 115, which can cease rollout of an updated client application 133 incorporating an updated version of the SDK library.

The data stored in the data store 113 can include, for example, update repository 142 and user account data 143. In some implementations, the data store 113 can also house data that facilitates operation of the management service 115, such as device profiles, and compliance rules. The contents of an example update repository 142 are described above. User account data 143 can include information pertaining to end users of the client devices 106 enrolled with the management service 115. User account data 143 an include data used to authenticate an end user, such as a username, password, email address, biometric data, device identifier, registry identifier, or other data.

User account data 143 can include information about user accounts in a particular enterprise. A user account can be an account in an enterprise directory service that provides for user management and access to enterprise resources such as email, documents, identity providers or single sign-on services, and other enterprise resources. Additionally, user account data 143 can include a reference, authentication token, or credentials that allow users to access third party services provided by the enterprise, such as a third-party services. An example of a third-party service can be a customer relationship management tool that federates authentication to a single sign-on service utilized by the enterprise.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system that runs a management component 131 and various client applications 133. The management component 131 can be a portion of the operating system or a standalone component that manages the client device 106 on behalf of the management service 115. The management component 131 can enforce compliance rules and policies, install configuration profiles, and perform other management actions on the client device 106 on behalf of the remotely executed management service 115.

In some examples, at least a portion of the client applications 133 are "managed applications" where the management service 115 can oversee or control operation of the client applications 133. For instance, using an administrator console, an administrator of the management service 115 can distribute, secure, and track client applications 133 installed on client devices 106 enrolled with the management service 115.

A client application 133 according to the disclosure can be any application that incorporates an SDK library as described herein. The SDK library can be maintained by an entity other than a developer of the client application 133. The SDK library can implement various features or provide various capabilities that the client application 133 can leverage. For example, the SDK library can implement user authentication so that the developer of the client application 133 does not have to implement a particular authentication flow. Instead, the client application 133 can simply invoke the SDK library and execute one or more calls provided by the SDK library that authenticates a user.

As another example, the SDK library incorporated into a client application 133 can determine whether a user account is permitted to access a restricted feature so that the developer of the client application 133 does not have to make this determination. The SDK library can work in concert with the management component 131 or a remotely executed service to provide various security, authentication, graphical, user interface, or other application features that can be implemented by a third party SDK library and utilized by the client application 133.

In one implementation, the SDK library can be implemented in code that is native to the client device 106. For example, in the case of an iOS® device, the SDK library can be implemented in Swift and compiled into native iOS code along with the client application 133 using the SDK. In the case of an Android device, the SDK library can be implemented in Kotlin and compiled into machine executable code on an Android device.

The application repository 107 can include, for example, a server computer or any other system providing computing capability. Alternatively, the application repository 107 can include a plurality of computing devices that are arranged, for example, in one or more server banks, computer banks, or other arrangements. The application repository 107 can include a grid computing resource or any other distributed computing arrangement.

The application repository 107 can be a third-party system or a system managed by the enterprise that can facilitate distribution of applications to client devices 106. The application repository 107 can be an application marketplace from which applications installed on client devices 106 are downloaded. The application repository 107 can be a system that is managed by a device ecosystem creator, such as Apple® or Google®, who can provide the operating system of client devices 106 and various developers tools that facilitate creation and distribution of applications to client devices 106. The application repository 107 can also represent a server or repository managed by an enterprise on behalf of its users to distribute applications to devices that are managed by the management service 115.

Figure 2:
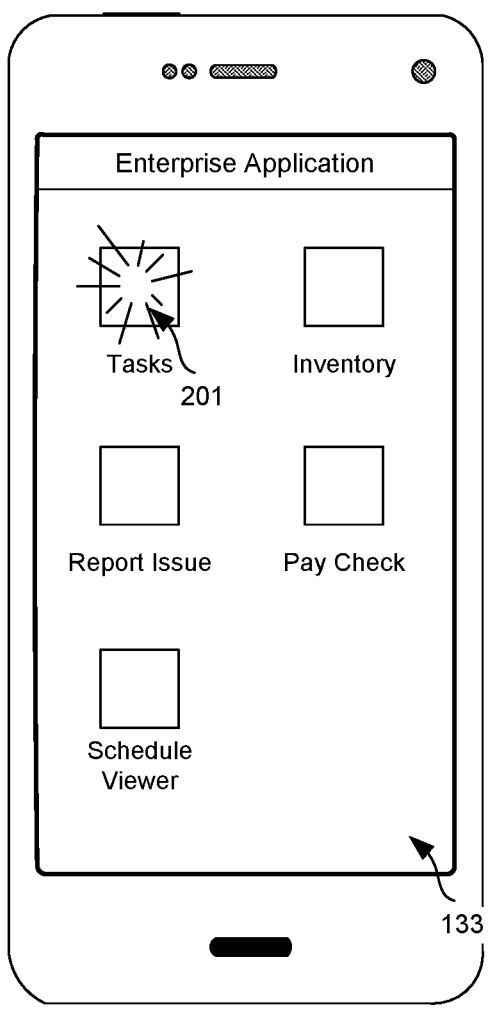
FIG. 2 is a user interface illustrating functionality according to examples of the disclosure.

Referring next to FIG. 2, shown is an example client application 133 according to examples of the disclosure. The client application 133 can incorporate an SDK library according to the disclosure, which can provide various features or functionality to the client application 133. As shown in the example of FIG. 2, the client application 133 can provide various features to the user. Some of the users can leverage functionality provided by the SDK library, such as user authentication, virtual private networking, or other features that might be incorporated into the SDK library and invoked by the client application 133.

Figure 3:
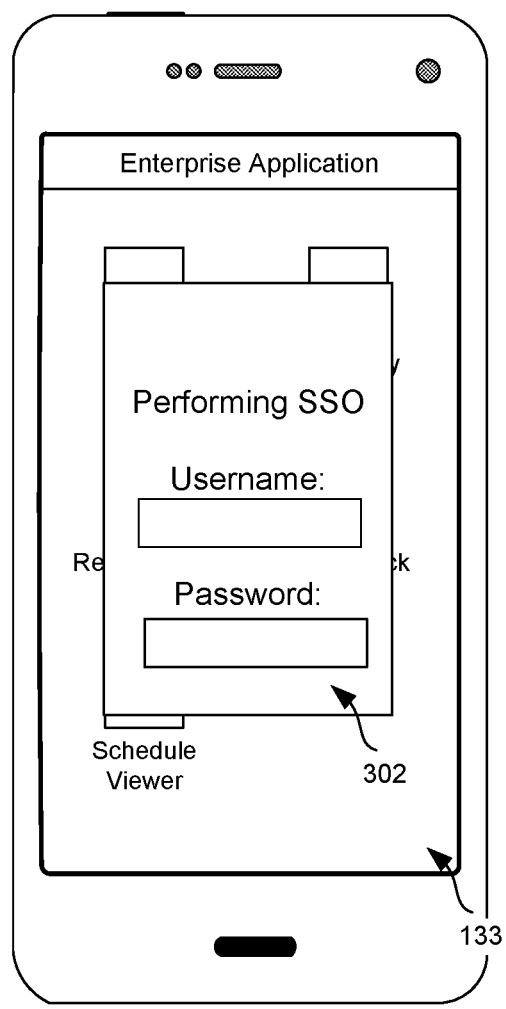
FIG. 3 is a user interface illustrating functionality according to examples of the disclosure.

In the scenario of FIG. 2, the user can select a feature 201 within the application. Continuing the scenario of FIG. 2, reference is now made to FIG. 3. In FIG. 3, the client application 133 can invoke user authentication capabilities provided by the SDK library in response to the user selecting the feature 201. The SDK library can implement an authentication workflow 302 that performs user authentication on behalf of the client application 133. The authentication workflow 302 can be periodically updated by the SDK library.

The authentication workflow 302 can communicate with a single sign-on platform or an identity manager utilizing a single sign-on protocol. The single sign-on protocol may be updated from time to time, which can require the SDK library to be updated. Accordingly, in examples of the disclosure, the SDK library can be updated without requiring the application developer to update the client application 133. Instead, the update repository service 122 and the SDK injection service 124 can update the client application 133, and the application monitoring service 126 can monitor the performance of the client application 133 after updating the SDK library in the event that the update impairs performance of the client application 133.

Figure 4:
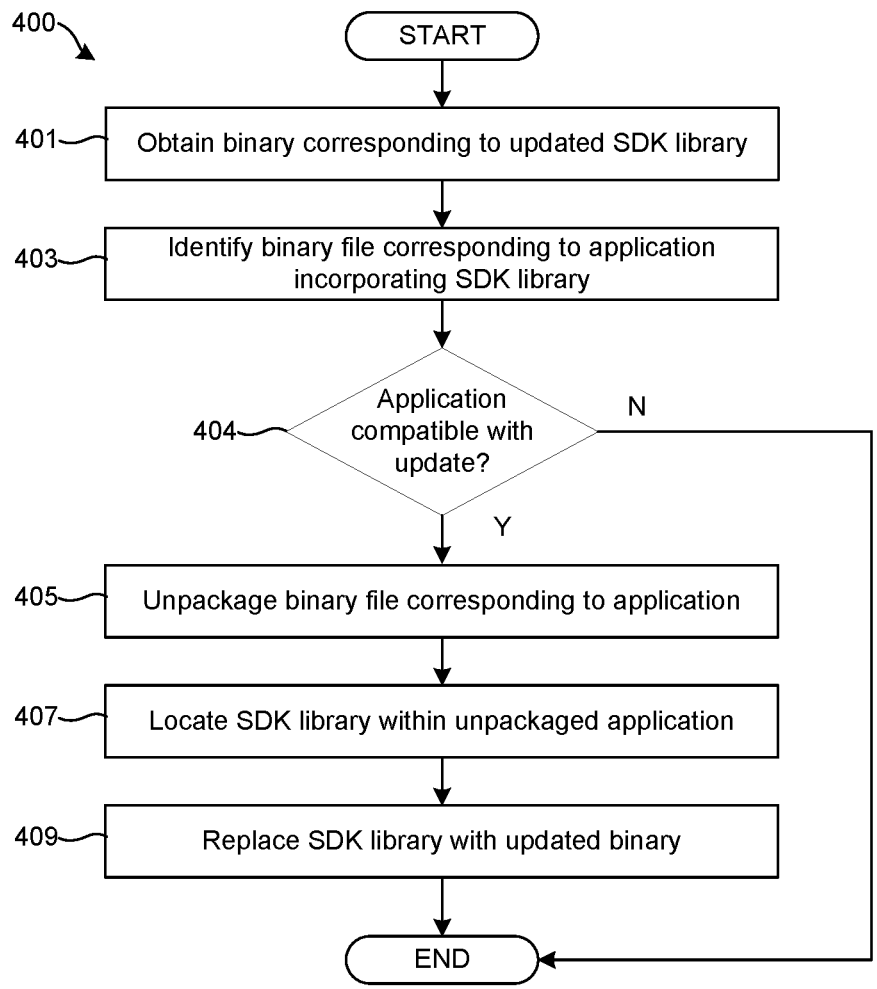
FIG. 4 is a flowchart diagram illustrating functionality implemented by components of the networked environment.

Referring next to FIG. 4, shown is a flowchart 400 that provides one example of the operation of a portion of the computing environment 103. The flowchart 400 can be viewed as depicting an example of elements of a method implemented by the SDK injection service 124 according to various embodiments of the disclosure. The management service 115 can orchestrate the process of obtaining the updated SDK library and the client application 133 to facilitate updating the client application 133 and distribution to a client device 106 that is managed by the management service 115. The separation or segmentation of functionality as discussed herein is presented for illustrative purposes only.

At step 401, the SDK injection service 124 can obtain a binary file corresponding to an updated version of the SDK library. The updated version of the SDK library can be provided to the update repository service 122 by an SDK library developer that maintains the SDK library. The binary file can represent an executable version of the SDK library that can be packaged with the client application 133 so that the client application 133, when installed on a client device 106, can utilize the features provided by the SDK library.

At step 403, the SDK injection service 124 can identify the binary file corresponding to a current version of the client application 133 that incorporates the SDK library provided at step 401. The binary file can represent a packaged installable version of the client application 133 that can be distributed to client devices 106. The binary file corresponding to the client application 133 can be obtained from the application repository 107 or uploaded to the SDK injection service 124 by an application developer.

At step 404, the SDK injection service 124 can determine whether the client application 133 is compatible with the SDK library. The SDK injection service 124 can make such a determination by determining whether there are any breaking features in the updated version of the SDK library that would render the SDK library incompatible with the client application 133. The breaking features list can be obtained from the update repository service 122 and can outline whether there are any features in the SDK library that would be incompatible with a previous version of the SDK library. The SDK injection service 124 can determine from metadata associated with the client application 133 that can be obtained from the application repository 107 about the features of the SDK library that are utilized by the client application 133.

If the SDK injection service 124 determines that the client application 133 is not compatible with the updated version of the SDK library, the process can proceed to completion without updating the client application 133. If the SDK injection service 124 determines that the updated version of the SDK library would be compatible with the current version of the client application 133, the process can proceed to step 405.

At step 405, the SDK injection service 124 can unpackage the binary file corresponding to the client application 133. The SDK injection service 124 can unpackage a binary file such as Android package, an Android App Bundle, an iOS application archive file, or any other binary file corresponding to a client application 133 that incorporates an SDK library.

The SDK injection service 124 can utilize application wrapping techniques to replace only the binary corresponding to the SDK library within an application package or executable file. In one example, the SDK injection service 124 can download or obtain a binary file corresponding to an application from the management service 115 or an application repository 107. The SDK injection service 124 can also download or obtain a binary file corresponding to an updated version of the SDK library from the update repository 142. In some examples, the binary corresponding to the SDK library can be obtained via the update repository service 122.

At step 407, the SDK injection service 124 can locate the SDK library binary within the client application 133. In one example, the SDK injection service 124 can look for a signature or another characteristic of the SDK library binary within the client application 133.

At step 409, the SDK injection service 124 can then replace the SDK library binary within the client application 133 with the binary file corresponding to the updated version of the SDK library. The SDK injection service 124 can update a minor version number corresponding to the client application 133, to indicate that the application has been updated with the updated version of the SDK library. In some examples, the version number update can be provided to the application repository 107 or the update repository service 122.

The SDK injection service 124 can re-sign the client application 133 if necessary according to the operating system for which the client application 133 is meant. The SDK injection service 124 can then cause the management service 115 to deploy the updated client application 133 to managed devices. In one example, the management service 115 can send a command to managed devices to retrieve the updated client application 133 from an application repository 107 in which the updated client application 133 can be stored by the SDK injection service 124.

Thereafter, the process can proceed to completion.

Figure 5:
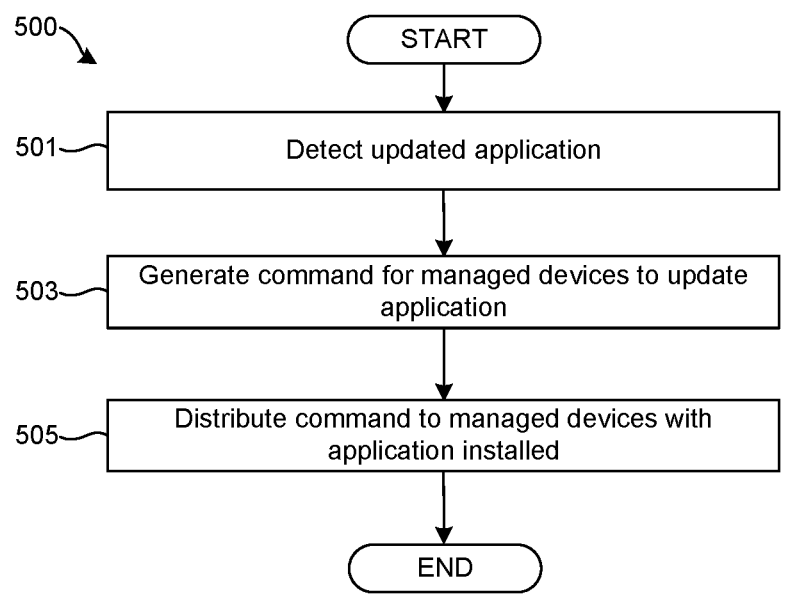
FIG. 5 is a flowchart diagram illustrating functionality implemented by components of the networked environment.

Referring next to FIG. 5, shown is a flowchart 500 that provides one example of how examples of the disclosure, such as the management service 115 can distribute an updated client application 133 that has been updated by the SDK injection service 124 with an updated version of the SDK library.

First, at step 501, the management service 115 can detect an updated application generated by the SDK injection service 124 In one example, the SDK injection service 124 can notify the management service 115 that the client application 133 has been updated with an updated version of the SDK library. In another example, the management service 115 can poll the application repository 107 to identify whether an updated version of a client application 133 has been uploaded there. As noted above, the SDK injection service 124 can update a minor version number associated with the client application 133 and upload a binary file corresponding to the updated version of the client application 133 to the application repository 107.

At step 503, the management service 115 can generate a command that causes devices on which the client application 133 is installed to update the client application 133 by downloading and installing the binary file corresponding to the client application 133 from the application repository 107. The command can be placed in a command queue corresponding to the managed devices that are running an operating system corresponding to the client application 133. The command queue can be maintained by the management service 115 on the computing environment 103.

At step 505, the management service 115 can distribute the command to the client devices 106 that are managed by the management service 115. The command can be distributed by causing the management component 131 on the respective client devices 106 to retrieve commands from the command queue. The command can include a download location of the updated version of the client application 133 containing the updated version of the SDK library. Upon retrieving the command from the command queue, the management component 131 can install the client application 133 on the client device 106 or instruct the operating system of the client device 106 to install the client application 133. Thereafter, the process can proceed to completion.

Figure 6:
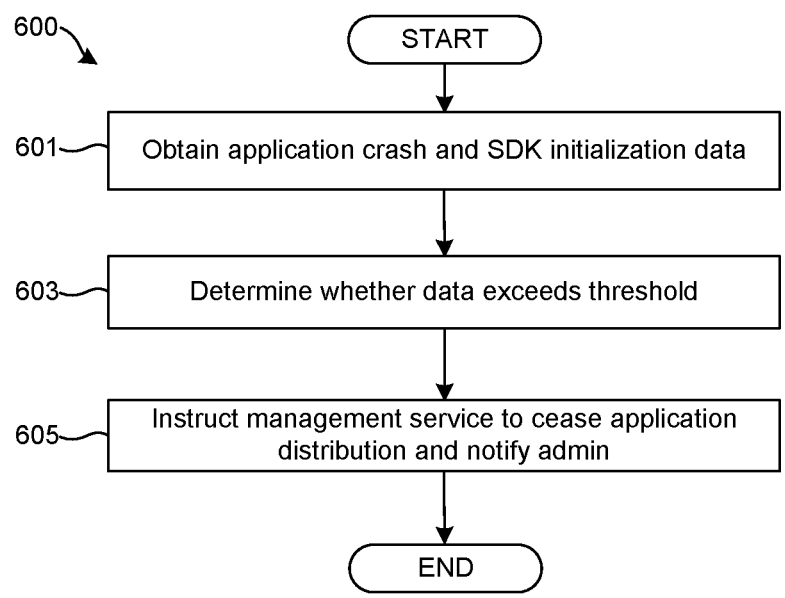
FIG. 6 is a flowchart diagram illustrating functionality implemented by components of the networked environment.

Referring next to FIG. 6, shown is a flowchart 600 that provides one example of how examples of the disclosure, such as the application monitoring service 126 can monitor performance of a client application 133 incorporating the SDK library and report the performance to the management service 115, which can determine whether to continue updating managed devices with a client application 133 or cause the managed devices to rollback to a previous version of the client application 133.

First, at step 601, the application monitoring service 126 can obtain application crash data and SDK initialization data from instances of the client application 133 that are installed on client devices 106. In one example, the client application 133 can be installed on a subset of client devices 106 as a test suite before rollout of the client application 133 onto a larger set of managed devices.

The application monitoring service 126 can monitor various instances or installations of a client application 133 that includes an SDK library that was pushed to devices by the management service 115 or otherwise installed on a client device 106. The application monitoring service 126 can monitor crash data, or cases of the client application 133 crashing on the client device 106. The application monitoring service 126 can also monitor initialization failure data associated with the SDK library. Initialization failure data can comprise a failure of the SDK library or a feature implemented by the SDK library from initialization or otherwise functioning but without causing the client application 133 to crash.

At step 603, the application monitoring service 126 can determine whether the crash data or the initialization data meets or exceeds respective thresholds. If crash data indicates a crash rate that is higher than a threshold, the application monitoring service 126 can notify the management service 115, which can cease rollout of an updated client application 133 incorporating an updated version of the SDK library at step 605. If initialization failure data indicates an initialization failure rate that is higher than a threshold, the application monitoring service 126 can notify the management service 115, which can cease rollout of an updated client application 133 incorporating an updated version of the SDK library at step 605.

Thereafter, the process can proceed to completion.

The client devices 106 or devices making up the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 133 and potentially other applications. Also stored in the memory can be a data store 113 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, the client application 133, and other various systems described herein can be embodied in software or code executed by general-purpose hardware as discussed above, as an alternative, the same can also be embodied in dedicated hardware or a combination of software/general purpose hardware and dedicated hardware.

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
at least one computing device comprising at least one processor; and
program instructions executable by the at least one computing device that, when executed, direct the at least one computing device to:
obtain a binary file corresponding to an updated version of a software development kit (SDK) library, the SDK library providing unified endpoint management (UEM) capabilities to an application incorporating the SDK library;
identify a binary file corresponding to the application incorporating the SDK library;
determine features of the SDK library that are utilized by the application;
determine that the application is to be updated by confirming that none of the features utilized by the application will stop functioning if the updated version of the SDK library is integrated into the application;
request an SDK injection service to integrate the updated version of the SDK library into the application without requiring an application developer of the application to create an updated version of the application, wherein the SDK injection service is configured to:
  download the binary file corresponding to the application from an application repository;
  unpackage the binary file corresponding to the application;
  locate a binary file corresponding to a previous version of the SDK library in the binary file corresponding to the application by searching for a signature corresponding to the SDK library;
  replace the binary file corresponding to the previous version of the SDK library with the binary file corresponding to the updated version of the SDK library;
  update a version of the application on the application repository to indicate that the application has been updated with the updated version of the SDK library; and
  re-sign the application with a developer signature of the application developer;
initiate distribution of an updated binary file corresponding to the application incorporating the SDK library to a plurality of devices that are managed by a management service;
monitor execution of the application on one or more of the plurality of devices to detect initialization failures of the features of the SDK library used by the application; and
cease the distribution of the updated binary file to the plurality of devices based on detecting the initialization failures.

2. The system of claim 1, wherein the program instructions initiate the distribution of the updated binary file by posting a notification to the management service, wherein the management service assigns the updated binary file corresponding to the application to the plurality of devices that are enrolled as managed devices.

3. The system of claim 1, wherein the program instructions that cause the at least one computing device to monitor the execution of the application include program instructions to at least:
  receive, from a device from the plurality of devices, an indication that the application incorporating the SDK library has crashed; and
  determine that a crash rate associated with the application incorporating the SDK library among the plurality of devices exceeds a threshold, and
  wherein the program instructions that cause the at least one computing device to cease the distribution of the updated binary file include program instructions to at least:
  notify the management service to stop distributing the updated binary file of the application incorporating the SDK library.

4. The system of claim 1, wherein the program instructions initiate the distribution of the updated binary file to the plurality of devices by placing a command in a respective command queue corresponding to the plurality of devices that instructs respective ones of the plurality of devices to download the updated binary file corresponding to the application from the application repository.

5. The system of claim 1, wherein the initialization failures comprise a failure of the SDK library or a feature implemented by the SDK library that does not cause the application to crash.

6. A method comprising
obtaining a binary file corresponding to an updated version of a software development kit (SDK) library, the SDK library providing unified endpoint management (UEM) capabilities to an application incorporating the SDK library;
identifying a binary file corresponding to the application incorporating the SDK library;
determining features of the SDK library that are utilized by the application;
determining that the application is to be updated by confirming that none of the features utilized by the application will stop functioning if the updated version of the SDK library is integrated into the application;
requesting an SDK injection service to integrate the updated version of the SDK library into the application without requiring an application developer of the application to create an updated version of the application, wherein the SDK injection service is configured to:
  download the binary file corresponding to the application from an application repository;
  unpackage the binary file corresponding to the application;
  locate a binary file corresponding to a previous version of the SDK library in the binary file corresponding to the application by searching for a signature corresponding to the SDK library;
  replace the binary file corresponding to the previous version of the SDK library with the binary file corresponding to the updated version of the SDK library;
  update a version of the application on the application repository to indicate that the application has been updated with the updated version of the SDK library; and
  re-sign the application with a developer signature of the application developer;
initiating distribution of an updated binary file corresponding to the application incorporating the SDK library to a plurality of devices that are managed by a management service;
monitoring execution of the application on one or more of the plurality of devices to detect initialization failures of the features of the SDK library used by the application; and
ceasing the distribution of the updated binary file to the plurality of devices based on detecting the initialization failures.

7. The method of claim 6, wherein the distribution of the updated binary file is initiated by posting a notification to the management service, wherein the management service assigns the updated binary file corresponding to the application to the plurality of devices that are enrolled as managed devices.

8. The method of claim 6, wherein the monitoring the execution of the application includes:
  receiving, from a device from the plurality of devices, an indication that the application incorporating the SDK library has crashed;
  determining that a crash rate associated with the application incorporating the SDK library among the plurality of devices exceeds a threshold; and
  wherein the ceasing the distribution of the updated binary file further includes:
  notifying the management service to stop distributing the updated binary file of the application incorporating the SDK library.

9. The method of claim 6, further comprising re-packaging the binary file corresponding to the application incorporating the binary file corresponding to the updated version of the SDK library to create the updated binary file.

10. The method of claim 6, wherein the initiating the distribution of the updated binary file comprises placing a command in a respective command queue corresponding to the plurality of devices that instructs respective ones of the plurality of devices to download the updated binary file corresponding to the application from the application repository.

11. The method of claim 6, wherein the initialization failures comprise a failure of the SDK library or a feature implemented by the SDK library that does not cause the application to crash.

12. A non-transitory computer-readable medium embodying program instructions executable by at least one computing device, the instructions, when executed, causing the at least one computing device to at least:

obtain a binary file corresponding to an updated version of a software development kit (SDK) library, the SDK library providing unified endpoint management (UEM) capabilities to an application incorporating the SDK library;

identify a binary file corresponding to the application incorporating the SDK library;

determine features of the SDK library that are utilized by the application;

determine that the application is to be updated by confirming that none of the features utilized by the application will stop functioning if the updated version of the SDK library is integrated into the application;

request an SDK injection service to integrate the updated version of the SDK library into the application without requiring an application developer of the application to create an updated version of the application, wherein the SDK injection service is configured to:

download the binary file corresponding to the application from an application repository;

unpackage the binary file corresponding to the application;

locate a binary file corresponding to a previous version of the SDK library in the binary file corresponding to the application by searching for a signature corresponding to the SDK library;

replace the binary file corresponding to the previous version of the SDK library with the binary file corresponding to the updated version of the SDK library;

update a version of the application on the application repository to indicate that the application has been updated with the updated version of the SDK library; and re-sign the application with a developer signature of the application developer;

initiate distribution of an updated binary file corresponding to the application incorporating the SDK library to a plurality of devices that are managed by a management service;

monitor execution of the application on one or more of the plurality of devices to detect initialization failures of the features of the SDK library used by the application; and cease the distribution of the updated binary file to the plurality of devices based on detecting the initialization failures.

13. The non-transitory computer-readable medium of claim 12, wherein the program instructions cause the distribution of the updated binary file to be initiated by posting a notification to the management service, wherein the management service assigns the updated binary file corresponding to the application to the plurality of devices that are enrolled as managed devices.

14. The non-transitory computer-readable medium of claim 12, wherein the program instructions that cause the at least one computing device to monitor the execution of the application include program instructions to at least:

receive, from a device from the plurality of devices, an indication that the application incorporating the SDK library has crashed;

determine that a crash rate associated with the application incorporating the SDK library among the plurality of devices exceeds a threshold; and wherein the program instructions that cause the at least one computing device to cease the distribution of the updated binary file include program instructions to at least:

notify the management service to stop distributing the updated binary file of the application incorporating the SDK library.

15. The non-transitory computer-readable medium of claim 12, wherein the program instructions further cause the at least one computing device to at least:

re-package the binary file corresponding to the application incorporating the binary file corresponding to the updated version of the SDK library to create the updated binary file.

16. The non-transitory computer-readable medium of claim 12, wherein the initialization failures comprise a failure of the SDK library or a feature implemented by the SDK library that does not cause the application to crash.

* * * * *